United States Patent [19]

Tarr et al.

[11] 4,331,843
[45] May 25, 1982

[54] APPARATUS FOR CONTROLLING AND INDICATING THE INTEGRITY OF THE CONNECTION OF TELEPHONE SUBSCRIBERS TO A SWITCHING SYSTEM

[75] Inventors: Lloyd A. Tarr, Elmhurst; John P. Taylor, Wheaton, both of Ill.; John S. Young, Scottsdale, Ariz.

[73] Assignee: GTE Automatic Electric Labs Inc., Northlake, Ill.

[21] Appl. No.: 220,497

[22] Filed: Dec. 29, 1980

[51] Int. Cl.³ .......................... H04B 3/46; H04M 3/26
[52] U.S. Cl. ...................... 179/175.2 R; 179/175.3 R
[58] Field of Search ................ 179/175.2 R, 175.2 C, 179/175.2 D, 175.3 R, 175.3 F, 175.3 S; 324/51, 52

[56] References Cited

U.S. PATENT DOCUMENTS 4,139,745 2/1979 Ashdown et al. ............ 179/175.3 F

*Primary Examiner*—Thomas A. Robinson
*Attorney, Agent, or Firm*—Robert J. Black; Frank J. Bogacz

[57] ABSTRACT

A system is shown for automatically detecting the integrity of telephone subscriber's line connection to a four wire switching system via a hybrid network.

10 Claims, 1 Drawing Figure

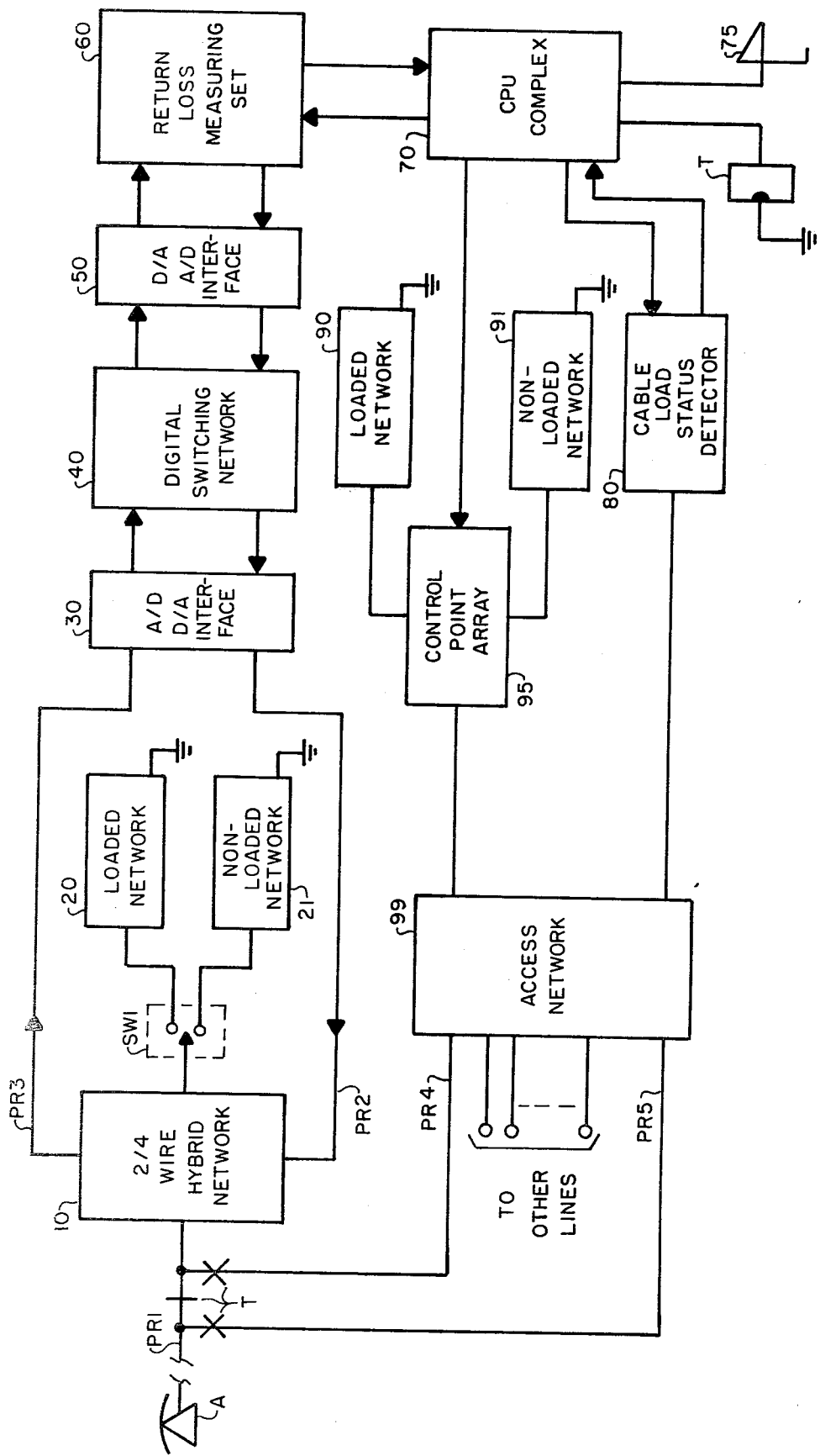

APPARATUS FOR CONTROLLING AND INDICATING THE INTEGRITY OF THE CONNECTION OF TELEPHONE SUBSCRIBERS TO A SWITCHING SYSTEM

BACKGROUND OF THE INVENTION

1. Field of the Invention

The present invention pertains to automatic test systems and more particularly to integrity determination of the connection between individual telephone subscribers and a four wire switching system.

2. Description of the Prior Art

Each subscriber of a telephone switching system is connected to that system by two wires, termed tip and ring. Switching systems typically these two wires in order to terminate them to the called subscriber's line. As long as the gain or loss along the loop connection from one subscriber to another is minimal, the two wire switching configuration will provide adequate transmission capability. However, when the gain or loss exceeds a threshold limit, amplification of the voice signals is necessary. An example of the gain/loss problem is a long distance telephone call.

A solution to the problem is to amplify each talking path, that is, from the first subscriber to the second subscriber and from the second subscriber to the first subscriber. Therefore, each transmission path requires two wires for amplification and each switching system must have the capability to switch four wires instead of merely two wires.

Four wire switching capability is also required within a digital switching system. Since PCM signals are transmitted by a digital switching system, two wires are required for each talking path as mentioned above.

Conversion apparatus is required to connect the four wire switching path to the telephone subscriber's two wire path. This conversion apparatus is a two wire to four wire hybrid network. This hybrid network is a balancing network with compensating networks connected to maintain the balance of the two wire to four wire connection. Any manipulation of the telephone subscriber's terminal equipment (eg. telephone handset) or change in the length or quality of the subscriber's loop connection affects the delicate balance of the hybrid network.

As the length of the telephone subscriber's loop changes or the type of line changes, the compensation networks must be altered to maintain the balance of the hybrid network.

Historically, the procedure for keeping each subscriber's line balance was a multi-step manual procedure. First, the load of the subscriber's two wire connection pair or cable must be dynamically measured. This measurement changes with the location of the subscriber equipment or the type of line. Second, a repairman would locate the subscriber's line circuit connection within the switching equipment. Next, the repairman must locate the hybrid circuit associated with this line and determine which type of compensation network is presently connected to the hybrid network.

Next, the repairman must open circuit the telephone subscriber's line and check the hybird network and compensation network through the switching system. The repairman must reestablish the telephone subscriber's connection to the system and compare the compensation network which is presently connected to the hybrid with the value obtained via his measurement. He then must make any alteration of networks, that may be required.

This procedure must be performed for each subscriber line. Furthermore, the procedure must be performed at periodic intervals for the entire switching system.

U.S. Pat. No. 4,139,745, issued on Feb. 13, 1979, to G. R. Ashdown et al, teaches a computer controlled test system only for detecting the load presently existing on a cable connecting the subscriber to the switching system.

Accordingly, it is the object of the present invention to provide an automated apparatus for controlling and indicating the integrity of the connection of a telephone subscriber's line to a four wire switching system.

It is a further object of the present invention to provide such an apparatus for use in monitoring each of the subscribers in a telephone switching office.

It is another object of the present invention to provide the mentioned service in an efficient and economical manner.

It is yet another object of the present invention to provide an automated system for periodically checking and controlling the proper connection of compensation networks to a hybrid network.

SUMMARY OF THE INVENTION

The present invention comprises apparatus for automatically controlling and indicating the integrity of a telephone subscriber's line connection to a four wire switching system. The apparatus includes a hybrid network connected between the individual telephone subscriber and the switching network. The connection from the subscriber to the hybrid network is accomplished via a first pair of cable leads. The connections from the hybrid network to the switching network are provided for by a second and a third pair, one pair providing a talking path in each direction.

The switching network provides a switching path for each of the second and third pair of leads to a test facility unit. The test facility unit is connected to a central processing unit (CPU) complex, which includes memory and data terminal units.

The CPU complex is connected to a cable status detector and to a loading network. The cable status detector and loading network are each connected the first pair of cable leads via an access network. A splitting relay is connected between the first pair of cable leads and the access network. The operation of this relay causes two loops to be established: one loop between the subscriber and the cable status detector via the access network; and, the other loop between the hybrid network and the loading network via the access network.

Under control of the CPU complex, the splitting relay is operated to establish the two loops mentioned. The CPU complex then instructs the cable status detector to measure the impedance characteristics of the subscribers line connection. This measurement is made by the cable status detector and transmitted to the CPU complex for storage.

Next, the CPU complex causes the loading network to operate so that a particular load termination is placed on the second loop between the hybrid network and the loading network. A switching connection is established between the test facility unit and the hybrid network via the second and third pair of leads. Then, a tone signal is transmitted on the second pair of leads and returned by the third pair of leads and subsequently the return signal is measured by the test facility unit and the result transmitted to the CPU complex for storage.

The CPU complex causes the loading network to operate to connect a second load termination to be placed on the loop to the hybrid network. The test facility unit is again operated to transmit the test tone and to transfer the resulting signal to the CPU complex. The CPU complex compares the two resultant signals and compares these signals to the previosuly stored cable status to determine whether the correct network termination is connected to the hybrid network in order to balance the two to four wire connection.

If the connection is improper the CPU complex switches the correct loading network onto the hybrid network to match the subscriber's line characteristic. In addition, a printout of all improper connections is made on a data terminal device so that a repairman may verify and note the change.

DESCRIPTION OF THE DRAWINGS

The single sheet of drawings included herewith is a schematic diagram embodying the principles of operation of the present invention.

DESCRIPTION OF THE PREFERRED EMBODIMENT

Referring to the single drawing sheet included, telephone subscriber A is connected to the switching system via a cable pair of leads PR1. The switching system is a four wire digital switch. Subscriber A is connected to the digital switching network 40 via 2/4 wire hybrid network 10. A/D-D/A interface unit 30 converts subscriber A's analog voice signals to digital signals for processing by the digital switching network 40 and interface unit 30 converts the digital signals produced by the switching network 40 to the analog signals for transmission to subscriber A. The connection from subscriber A to the network 40 must be balanced along each voice path, the first path along cable pair PR2 and the second voice path along cable pair PR3. In order to compensate for the length of subscriber A's cable pair PR1 and the type of that line, hybrid network 10 is connected to an impedance network. Since the length or type of this connection may change the impedance network must be changed to maintain proper balance. Therefore, hybrid network 10 is connected to either loaded network 10 or nonloaded network 21 via a switch SW1. Switch SW1 may be a manual or an automatic computer controlled switch.

The impedance characteristics of a nonloaded network are a resistance of 825 ohms and a capacitance of 0.05 microfarads. The impedance characteristics of a loaded network are a resistance of 1650 ohms and a capacitance of 0.01 microfarads.

Another D/A-A/D interface unit 50 connects a return loss measuring set 60 to the switching network 40. Return loss measuring set 60 is commercially manufactured unit by the Wiltron Corporation model number 9031. Set 60 sends a test tone signal and measures a signal returned to it, to determine the balance of hybrid network 10. Measuring set 60 is connected to CPU complex 70 for transmitting data in response to a request from the CPU complex 70. In addition, data terminal 75 is connected to the CPU complex 70.

Subscriber A's line is connectable to access network 99 via two additional pair of leads PR4 and PR5. When splitting relay T is operated by CPU complex 70, two paths are established. One path is made from subscriber A through access network 99 to cable load status detector 80 and the second path is made from hybrid network 10 through access network 99 to control point array 95. Control point array 95 can connect loaded network 90 or nonloaded network 91 to hybrid network 10. Both control point array 95 and cable load status detector 80 are connected to CPU complex 70.

An example will best serve to illustrate the operation of the system. CPU complex operates relay T causing cable pair PR1 to be connected via pair PR5 to access network 99 and in addition, hybrid network is connected via pair PR4 to the access network 99. CPU complex 70 operates the cable load status detector 80 to determine the loading status of subscriber A's cable pair PR1 and the status is returned to the CPU complex 70 for storage. Next, CPU complex 70 operates the control point array 95 to establish a connection from loaded network 90 via access network 99 to hybrid network 10. CPU complex 70 operates switching network 40 to connect measuring set 60 via interface unit 50, network 40, through interface network 30 to hybrid network 10 via two pairs of leads PR2 and PR3.

Measuring set 60 sends an interrogate signal on transmit pair PR2 and measures the level of the signal returned on the receive pair PR3. This measurement is transmitted to the CPU complex 70 for storage and further analysis.

Then CPU complex 70 operates control point array 95 to connect nonloaded network 91 to hybrid network 10. Measuring set 60 is again operated by CPU complex 70 to perform a second measurement and the result is transmitted to the CPU complex 70 for analysis.

The two measurements are compared by CPU complex 70. A lower level of signal returned to measuring set 60 will be obtained when the value of the loading network (loaded network 20 or nonloaded network 21) connected via switch SW1 to the hybrid network 10 matches the loading network connected for the test (loaded network 90 or nonloaded network 91). Therefore, CPU complex 70 determines whether the correct balancing network is connected to hybrid network 10 and if not what loading network will best balance the cable pair. Any imbalance is printed on the data terminal 75 and in the case of a manual switch SW1, switching is performed manually. In the case of an automatic switch SW1, CPU complex 70 will print out the imbalance condition on data terminal 75 and perform the switching automatically.

This procedure is performed for all cable pairs within the switching system via connections made by the access network 99. In addition, this scheme may be expanded to switch more than two kinds of loading networks.

Athough the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a switching system including a digital network, at least one telephone subscriber connected to said switching via a first pair of leads, said first pair of leads connected to said digital network via a second and a third pair of leads, the improvement comprising:

circuit means for balancing said connection of said first pair of leads to said second and third pair of leads and said circuit means connected via said first pair of leads to said telephone subscriber and connected via said second and third pair of leads to said digital network;

said circuit means including a first subcircuit of a first characteristic and second subcircuit of a second characteristic, said first subcircuit connected to said circuit means and alternatively, said second subcircuit connected to said circuit means;

CPU means for controlling and storing data;

detection means for determining the status of said first pair of leads, said detection means connected between said first pair of leads and said CPU means, said detection means operated in response to said CPU means to measure the impedance of said first pair leads and to transmit said measurement to said CPU means for storage:

network means for simulating said first pair of leads connected to said circuit means and to said CPU means, said network means operated in response to said CPU means selectively to connect a termination of a first characteristic to said circuit means and alternately to connect a termination of a second characteristic to said circuit means;

test means for injecting a first signal and measuring a second signal, said test means connected through said digital network to said circuit means via said second and third pair of leads, said test means further connected to said CPU means, said test means operated in response to said CPU means to transmit said first signal and to receive said second signal and said test means further operated to transmit said second signal to said CPU means;

said network means operated in response to said CPU means to connect said termination of said first characteristic to said circuit means and said test means operated in response to said CPU means to transmit said first signal to said circuit means and transmit said received second signal to said CPU means, and alternately, said network means operated in response to said CPU means to connect said termination of said second characteristic to said circuit means and said test means further operated in response to said CPU means to transmit said first signal to said circuit means and transmit said received second signal to said CPU means; and said CPU means operated in response to each of said transmitted second signals to compare each of said second signals to detect said connection of said first subcircuit to said circuit means in order to match said first characteristic subcircuit to said first pair of leads and alternatively to detect said connection of said second subcircuit to said circuit means in order to match said second characteristic subcircuit to said first pair of leads.

2. The improvement according to claim 1, wherein said circuit means further includes:

a circuit for establishing a balanced two wire to four wire connection;

switching means connected between said circuit and said first and second subcircuits, said switching means operated to connect said first subcircuit to said circuit and alternatively said switching means operated to connect said second subcircuit to said circuit.

3. The improvement according to claim 2, wherein said switching means is manually operated.

4. The improvement according to claim 2, wherein said switching means is operated in response to said CPU means.

5. The improvement according to claim 1, wherein there is further included:

a plurality of telephone subscribers;

an access network connected to said CPU means via said network means and via said detection means, said access network selectively connectable to each of said plurality of telephone subscribers, said access network operated to connect each of said telephone subscriber's first pair of leads to said CPU means for said determination of said connection of said first subcircuit and alternatively said connection of said second subcircuit.

6. The improvement according to claim 5, wherein said CPU means includes:

data terminal means connected to said CPU means and operated to produce a printed copy of said determination for each of said plurality of telephone subscriber's first pair of leads; and said data terminal means further operated to provide a printed warning message for each of said determinations which indicate an improper connection of said first subcircuit and alternatively of said second subcircuit.

7. The improvement according to claim 6, wherein said data terminal means is located within said switching system.

8. The improvement according to claim 6, wherein said data terminal means is located remote from said switching system.

9. The improvement according to claim 6, wherein said connection of said data terminal means to said CPU means includes:

an input connection from said data terminal means to said CPU means, said connection for permitting said measurement of each of said telephone subscriber's first pair of leads.

10. The improvement according to claim 1, wherein said detection means further includes:

a splitting relay connected to said CPU means and operated in response to said CPU means to open circuit said first pair of leads from said circuit means, said relay further operated to establish a connection from said telephone subscriber via said first pair of leads to said detection means, and said relay operated to establish a connection from said circuit means to said network means.

* * * * *